United States Patent [19]

Kleid

[11] 4,004,962
[45] Jan. 25, 1977

[54] SEALING MACHINE
[75] Inventor: Robert Eugene Kleid, Fairfield, Conn.
[73] Assignee: Pitney-Bowes, Inc., Stamford, Conn.
[22] Filed: June 9, 1975
[21] Appl. No.: 584,872
[52] U.S. Cl. .............................. 156/475; 156/444; 156/477 R; 156/479; 156/522; 156/DIG. 31
[51] Int. Cl.² ......................................... B32B 31/00
[58] Field of Search .......... 156/201, 202, 204, 216, 156/475, 479, 486, 492, 510, 516, 517, 519, 520, 521, 522, 571, DIG. 31, 444

[56] References Cited
UNITED STATES PATENTS

| | | | |
|---|---|---|---|
| 1,732,908 | 10/1929 | Murphy | 156/486 X |
| 2,056,451 | 10/1936 | Haberstump | 156/444 X |
| 2,062,280 | 12/1956 | Aanesen et al. | 156/216 X |
| 2,652,166 | 9/1953 | Johnson | 156/522 |
| 3,322,600 | 5/1967 | Harrison et al. | 156/519 X |
| 3,447,987 | 6/1969 | Williams | 156/492 |
| 3,745,081 | 7/1973 | Erekson | 156/521 X |
| 3,798,109 | 3/1974 | Gamroth | 156/DIG. 31 X |

Primary Examiner—David A. Simmons
Attorney, Agent, or Firm—Donald P. Walker; William D. Soltow, Jr.; Albert W. Scribner

[57] ABSTRACT

An automatic machine which utilizes sealing tape to seal the edges of a folded article passing therethrough. The machine is so designed that articles which do not require sealing pass through unimpeded. Other articles are sealed by one or more cylindrically-shaped tape applying heads, to each of which there is fed a supply of sealing tape, in combination with folded apparatus. At the appropriate time each of the taping heads is caused to advance against the article to be sealed, causing a portion of the tape to stick to the article. The taping head revolves slightly under the influence of the moving article and then comes to an abrupt halt, breaking the tape. The folding apparatus holds the non-adhered portion of the detached tape around the edge to be sealed and into engagement with the opposite side of the article.

8 Claims, 17 Drawing Figures

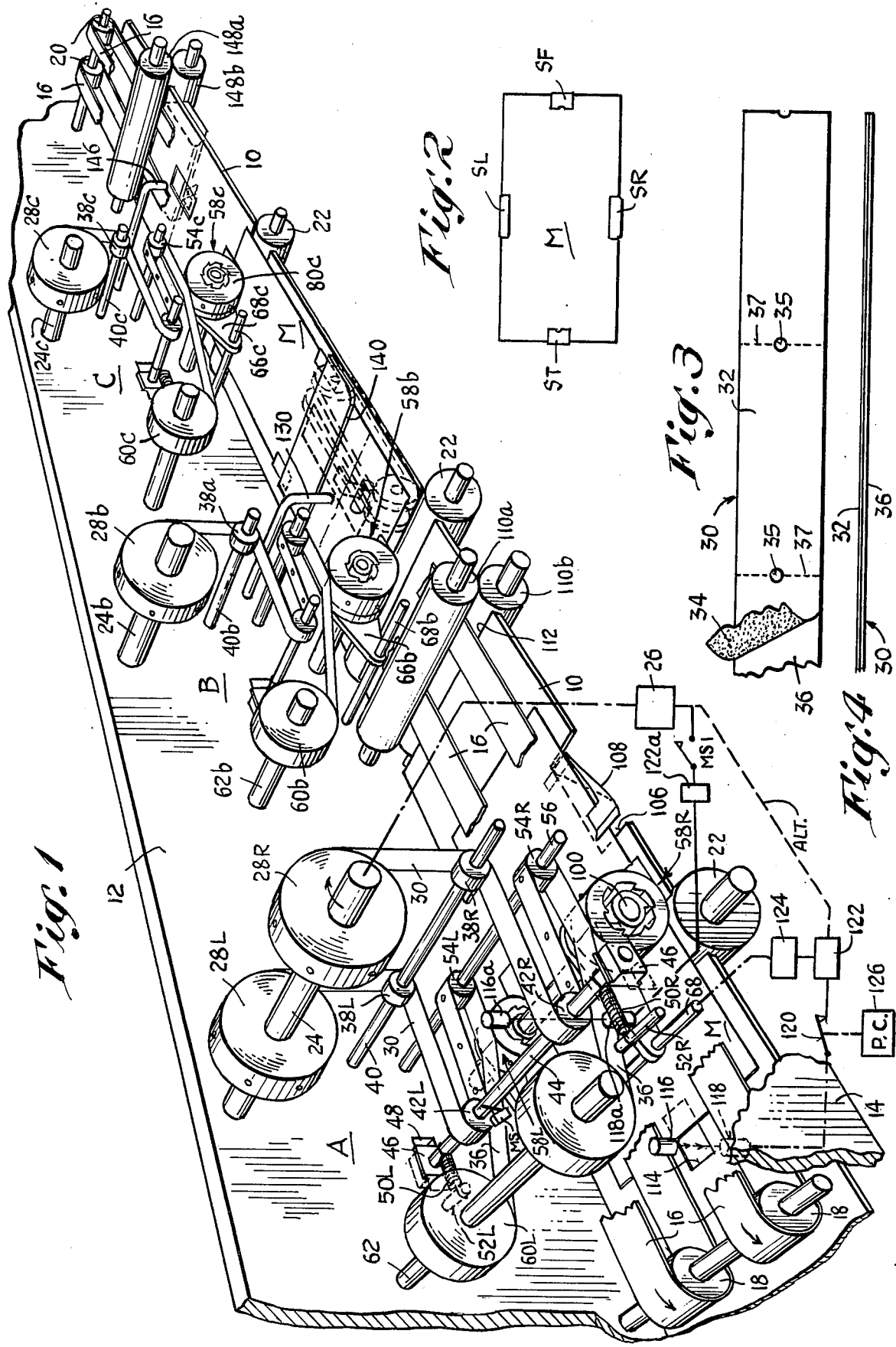

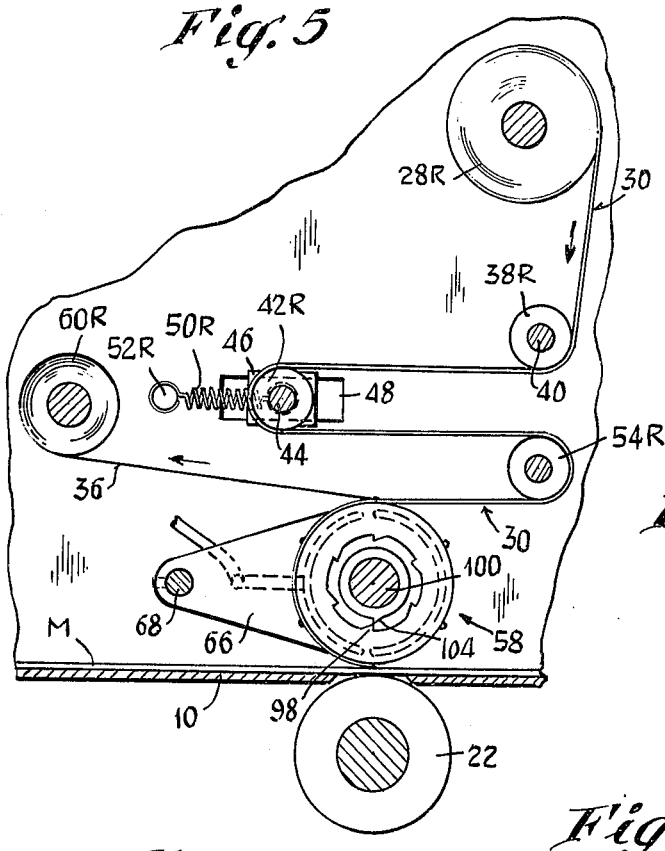
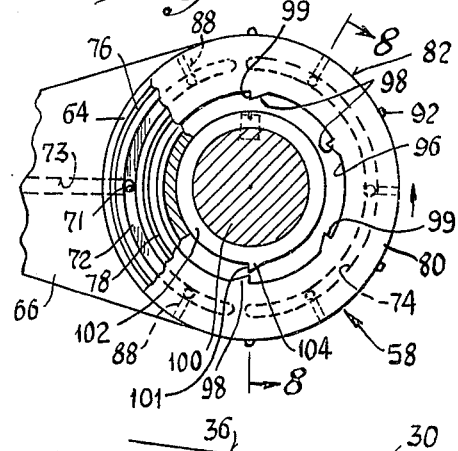
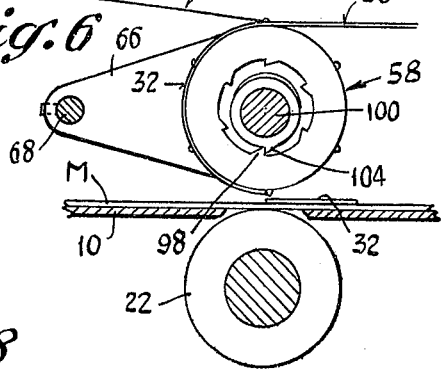
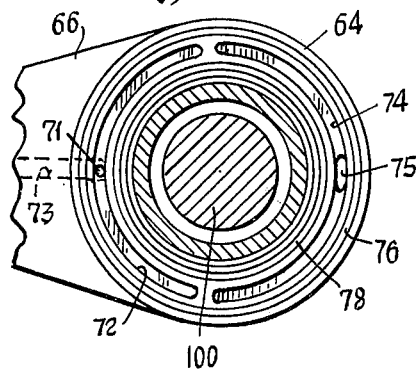
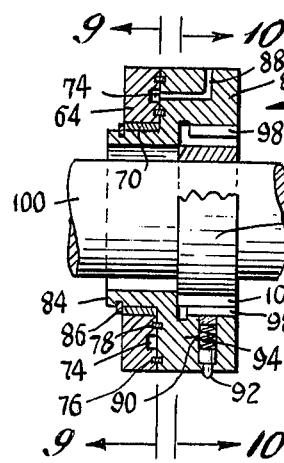
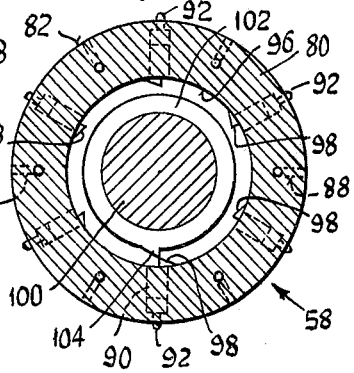
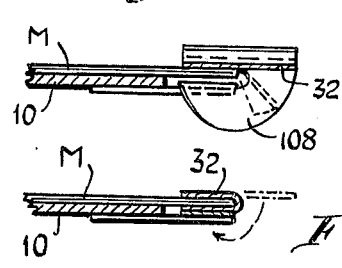
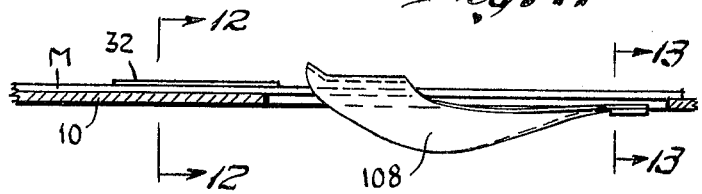

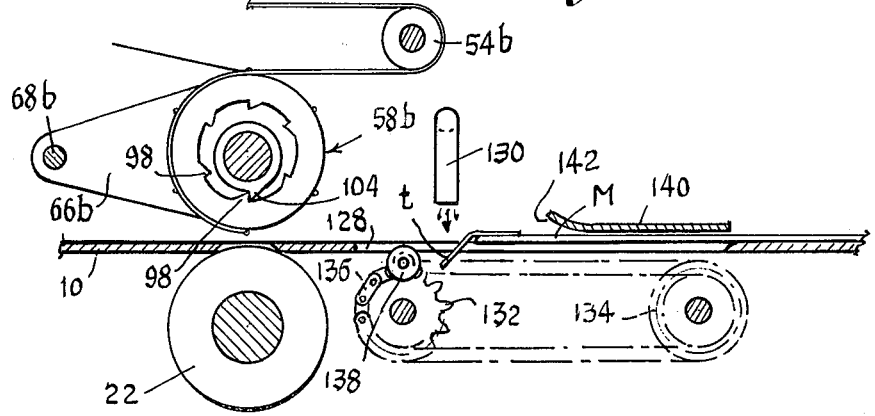
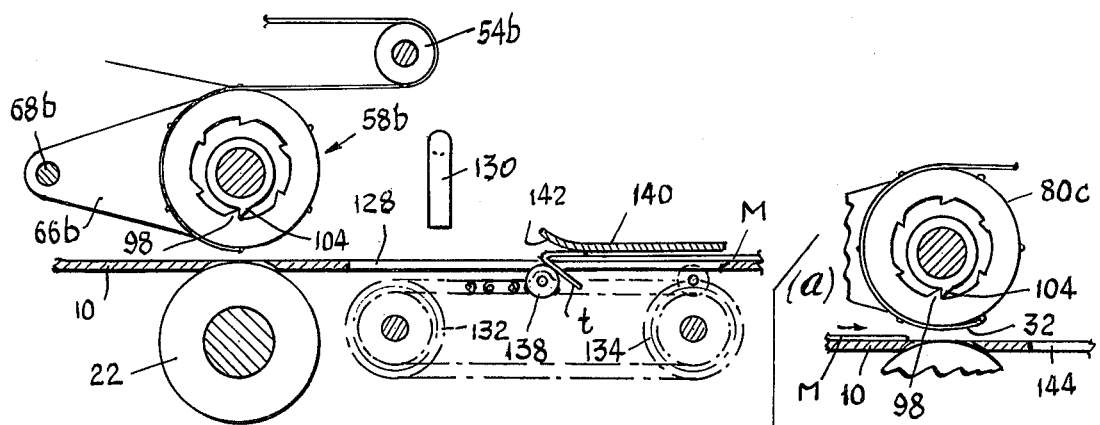
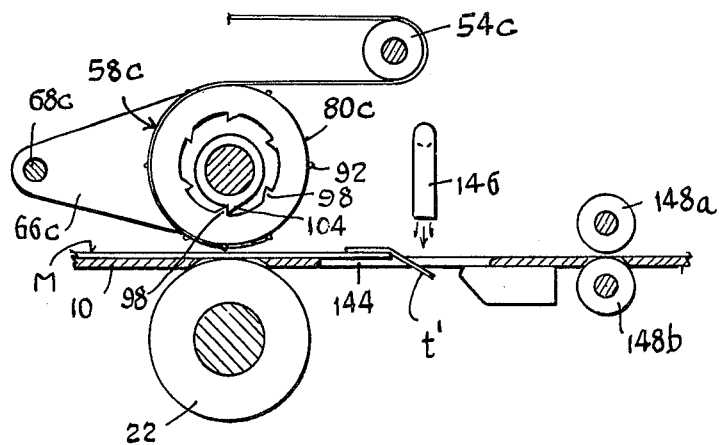
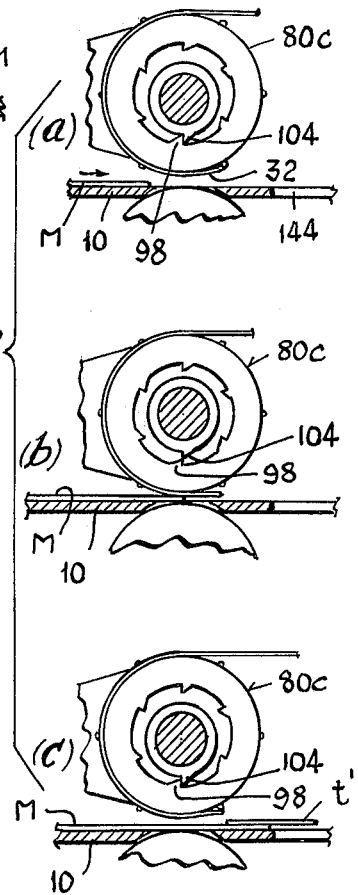

SEALING MACHINE

OBJECTS OF THE INVENTION

It is a primary object of the present invention to provide an automatic sealing machine for applying sealing tape to the edges of folded sheet material. It is a further object to provide such a machine which is operable on command and which presents an unimpeded path to articles not requiring sealing. Other objects, features, and advantages will be apparent from the following description and appended claims.

SUMMARY OF THE INVENTION

Apparatus is provided for sealing an article of folded sheet material having opposite side surfaces and a pair of substantially aligned edges to be sealed. The apparatus includes means for transporting the article along a predetermined path of travel and tape applying means including a rotatable taping head. The taping head has a substantially cylindrical surface which is normally spaced from said article. A supply of sealing tape having a non-adhesive major surface and an adhesive major surface is partially wrapped on the taping head to dispose the non-adhesive surface in contact with the taping head surface and expose the adhesive surface. Means are provided for moving the taping head and thus the tape wrapped on the head toward and away from said article to adhere a portion of a length of wrapped tape to one side of said article. In addition, means are provided for detaching the length of tape, adhered to the article, from said head. And, means are provided for folding the length of detached tape around the aligned edges and into adherence with the opposite side surface of said article, thereby sealing the aligned edges.

BRIEF DESCRIPTION OF THE DRAWINGS

FIG. 1 is a perspective view of apparatus in accordance with the present invention, portions thereof being broken away to illustrate its internal construction;

FIG. 2 is a plan view of a folded article sealed by the apparatus of this invention;

FIG. 3 is an illustration of a section of sealing tape as employed in the apparatus of the present invention;

FIG. 4 is an edge view of the tape of FIG. 3;

FIG. 5 is an elevational view of one of the tape feed stations of this invention at one point during the operating sequence;

FIG. 6 is an elevational view of the tape head shown in FIG. 5 at a different point in the sequence of operation;

FIG. 7 is an enlarged elevational view of the tape applicator head employed in this invention, portions thereof being broken away to illustrate its internal construction;

FIG. 8 is a cross-section taken substantially along the line 8—8 of FIG. 7;

FIG. 9 is a cross-section taken substantially along the line 9—9 of FIG. 8;

FIG. 10 is a cross-section taken substantially along the line 10—10 of FIG. 8;

FIG. 11 is a side view of a fold-over guide forming a portion of this invention;

FIG. 12 is a cross-section taken substantially along the line 12—12 of FIG. 11;

FIG. 13 is a cross-section taken substantially along the line 13—13 of FIG. 11;

FIG. 14 is a cross-sectional view illustrating the trailing end sealing station of the apparatus of this invention at one point during its sequence of operation;

FIG. 15 is a view similar to FIG. 14 showing the operation at a later point in the sequence of operation;

FIG. 16 is an elevational view showing the forward end sealing station; and

FIG. 17 is a sequence of illustrations showing the operation of the apparatus of FIG. 16.

DESCRIPTION OF THE PREFERRED EMBODIMENT

There is illustrated in FIG. 1 apparatus in accordance with this invention which includes three sealing stations, a side edge sealing station "A", a trailing edge sealing station "B", and a forward edge sealing "C". The construction and operation of each of these stations will be discussed separatively however, certain elements of the apparatus are common to all stations. These common elements include, for example, a bed plate 10, a vertical back wall 12, and a vertical front wall 14. The latter is virtually entirely broken away to illustrate the construction of the apparatus. In order to simplify the showing, many of the conventional elements such as bearings, bushings, etc. are omitted. The transport portion of the apparatus is common to all stations. This comprises a pair of friction belts 16 which extend between a pair of drive rollers 18 at the input end of the machine and a pair of idler rollers 20 at the output end. These belts rotate in the direction illustrated by the arrows and are so disposed that they lie against the surface of bed plate 10 and, by frictional engagement, transport therealong the articles, such as mail M, to be sealed. The transporting function of the belt 16 is aided by lower drive rollers 22, which are accordingly considered to be a part of the transport mechanism common to all stations.

Edge Sealing Station

This station (A) is designed to seal both left and right side edges of a folded article of mail M passing through the station. It comprises a tape supply shaft 24 which extends between suitable bearings in the walls 12 and 14 and is driven by a motor 26, illustrated schematically. Mounted upon the tape supply shaft 24 for rotation therewith, are tape supply rolls 28L, 28R. The tape 30 which is carried by these rolls is illustrated in detail in FIGS. 3 and 4. It is a composite and comprises a tape portion 32 which carries on one of its major surfaces a pressure sensitive adhesive 34 to which is adhered a protective backing 36. The tape includes a plurality of sprocket holes 35, equidistanly spaced lengthwise of the tape 30, and a transverse array or line of perforations 37 at each hole. The composite tapes 30 pass over a pair of idlers 38L, 38R which are mounted on a common shaft 40, then proceed horizontally to and around a pair of tensioning rollers 42L, 42R, which are mounted on a common shaft 44. The ends of shaft 44 are secured in conventional slide bearings 46, slidably mounted in horizontal slots 48 in walls 12, 14. Tension springs 50L, R extend between the shaft 44 and support pins 52L, R in the appropriate wall. After leaving tensioning rollers 42, the tapes 30 pass around idler rollers 54L, R, mounted on a common shaft 56, to tape applying means 58L, R. At this point, however, the protective backing 36 is detached from each tape and is taken up on backing spools 60L, R mounted on a common shaft 62.

The tape applying means 58 are identical in construction and will be explained with particular reference to FIGS. 5–10. Each such applying means 58 comprises a non-rotatable, annular manifold ring 64. Formed as an integral part of the ring 64 is a bracket 66 which is fixedly mounted on a shaft 68 for rotation therewith. The inner circular surface of the ring 64 carries a bearing 70 (FIG. 8). The planar surface of the ring 64, as viewed in FIG. 9, defines an arcuate vacuum manifold groove 72 which connects through an opening 71 to a suitable local source of supply of vacuum via a vacuum conduit 73. Concentric therewith but on the opposite side of ring 64 is an arcuate vent groove 74 vented to atmosphere through a suitable opening 75. Outer 76 and inner 78 circular sealing rings are seated in suitable recesses machined in the face.

Mounted axially against the planar face of the manifold ring 64 is annular taping head 80. The taping head 80 includes a smooth cylindrical tape transporting surface 82 and a reduced diameter stem 84 which is mounted within the bearing 70 and secured thereto by means of retaining ring 86. Communicating with the tape support surface 82 are a plurality of circumferentially spaced L-shaped passages 88 which extend from such surface to the rear surface of head 80 where they communicate with one of the manifold grooves 72, 74. Intermediate the passages 88 are a plurality of radial recesses 90 from which extend retractable sprockets 92 which are biased resiliently outward by means of coil springs 94. The annular inner surface 96 of head 80 includes a plurality of teeth 98 projecting towards and extending parallel to the axis of rotation of the head 80. As illustrated most clearly in FIGS. 7 and 10, the teeth 98 each include a radially extending shoulder 99. Extending through the open centers of manifold ring 64 and taping head 80 is a stationary shaft 100 upon which is fixedly mounted a ring 102 from which a cog 104 projects. The cog 104 extends parallel to the axis of rotation of the head 80 along the lower surface of the shaft 100, and has a shape substantially identical to the teeth 98, but includes an oppositely facing shoulder 101 as shown in FIGS. 7 and 10. The assembly of the ring 64, shaft 68 and bracket 66 is capable of partial rotational movement whereas the taping head 80 is capable of full rotational movement. In its normal unactuated position, assembly is raised, as is illustrated in FIG. 6, so that the axes of the shaft 100 and the taping head 80 are non-concentric. When so disposed, one of the teeth 98 of the taping head 80 rests against the cog 104 on shaft 100.

Referring back to FIG. 1, it should be pointed out that suitable guiding means, such as any well-known arrangement of guideways for aligning the opposite side edges of a folded piece of sheet material parallel to the longitudinal length of the bed plate 10, are provided for insuring that each piece of mail M follows a predetermined path of travel along the bed plate 10. The function of station A is to seal the side edges of each article of folded sheet material. To this end the tape applying means 58L, 58R are positioned to overhang the edges of articles M as they pass thereunder and along the bed plate 10. Just downstream of each of the taping heads 80, the bed plate 10 defines a recess 106 within which is mounted a curved guide plate 108 which functions to fold a sealing tab as will be later explained. Downstream from the guide plate 108, a pair of pinch rollers 110a, b are disposed within a gap 112 in the bed plate 10 to complete the sealing function of station A. Of course, one or more additional pairs of pinch rollers, such as rollers 10a, b, may be provided at spaced intervals lengthwise of the bed plate 10 to ensure continuously feeding the sheet material along the bed plate 10.

Suitable sensing means are provided for actuating the sealing process upon arrival of an article M. Although various types of well-known sensing means may be provided without departing from the spirit and scope of the invention, there is illustrated, in FIG. 1, an arrangement of apparatus for detecting the arrival of the leading edge of the article M. A cutout 114 is provided in the bed plate 10. A light source 116 is mounted above the cutout and a photoelectric detector 118 is positioned below the cutout. The signal produced by interruption of the beam by the leading edge of an article M is transmitted over a normally closed switch 120 to a logic circuit 122. After a suitable time delay, as established by the conditions of the operation, the logic circuit 122 actuates the shaft 68 as, for example, through a solenoid 124 to rotate the shaft 68, and thus the attached bracket 66 and ring 64, thereby moving the taping head 80 toward and then away from the bed plate 10. The normally closed switch 120 may be actuated by a process controller 126, responsive for example to a remotely generated signal, to disable the sealing function to permit the passage of articles which do not require sealing.

In addition, suitable sensing means well-known in the art are provided for selectively feeding tape 30 from the supply rolls 28 so that forces due to high acceleration experienced by the taping head 80 are not experienced by the tape 30 or supply rolls 28. Rather, such forces are absorbed by the springs 50 of the take-up shaft 44. Although various types of such sensing means may be provided without departing from the spirit and scope of the invention, there is illustrated in FIG. 1 a light source 116a mounted above and forwardly of the shaft 44, a photoelectric detector 118a positioned below and forwardly of the shaft 44, and a micro-switch MS positioned at the shaft 44 having a contact MS-1 which is normally held open by the shaft 44. The source 116a and detector 118a are preferably spaced a predetermined distance forwardly of the shaft 44; such distance being substantially equal to one-half of, or a multiple of one-half of, the distance between next adjacent transverse lines of perforations 37 in the tape 30, depending on the magnitude of the load on the spring 50 due to acceleration of the tape 30 and depending on the bursting strength of the tape 32. When the shaft 44 initially moves forwardly it closes the micro-switch contact MS-1 to enable the logic circuit 122a to operate the motor 26. Continued forward motion interrupts the beam of light between source 116a and detector 118a. The signal produced by such interruption is transmitted to the enabled logic circuit 122a, which applies power through contact MS-1 to actuate the motor 26. The motor 26 drives shaft 24 to feed tape 30 to the rollers 42, thereby relaxing the springs 50. Whereupon the shaft 44 returns to the position shown in FIG. 1 and opens the micro-switch contact MS-1 to disable the motor 26. Of course, rather than provide the sensing means 116a, 118a and logic circuit 122a, the logic circuit 122 may be programmed by means well-known in the art to actuate the motor 26 and thus drive the shaft 24 each time, or at some multiple of each time, a folded sheet is sensed by detector 118. The utilization of either sensing means insulates the supply rolls 28 from forces due to tape acceleration and permits the motor 26 to feed the tape 30 from the rolls 28 during a time interval equivalent to the time interval between successive sheets arriving at the station (A), rather than the lesser time interval during which the taping head 80 rotates.

Edge Sealing Operation

The operation of station A, the edge sealing station, will now be explained with particular reference to FIGS. 1 and 5-13. The apparatus and operations for sealing the left and right edges of each article M are substantially identical. Accordingly, only one will be described.

As previously explained, the taping head 80 is mounted for rotation on bracket 66 and is movable therewith toward and away from the bed plate 10. However, this movement is very slight and may be, for example, 1/16 - ⅛ inch. The operation begins with the head 80 in the raised position as shown in FIG. 6 whereby one of the teeth 98 has its shoulder 99 disposed in contact with the shoulder 101 of the cog 104, as a result of which the fixed shaft 100 prevents the head 80 from being rotated. As previously explained, the composite tape 30 is separated at the top of the taping head 80 with the backing 36 proceeding on to the backing spool 60 and the adhesive tape 32 proceeding around the periphery of the taping head 80 with is adhesive side outward. Registration of the tape 32 with respect to folded sheet material M is assured by the sprockets 92 engaging the sprocket holes 35 in the tape. The tape 32 extends around the lef hand surface of the head as viewed in FIG. 7 and terminates at the lowermost of the sprockets 92. The tape 32 is held against the taping head 80 by means of the vacuum from the local source in the manifold groove 72 as transmitted by the passage 88 to the underside of the tape 32.

Upon receipt of a signal from the sensing means, 116, 118, that an article has been received for sealing, the logic circuit 122 is signaled. Slightly before the center of the article M appears under the center of the applicator head 58, the solenoid 124 is actuated to move the applicator 58 downwardly to the bed plate 10 and thus against the surface of the article M as shown in FIG. 5. This causes the leading edge of the adhesive tape 32 to engage and stick to the edge of the article M with approximately half the width of the tape extending outwardly over the edge of the article M. In order to permit the adhesive tape to make contact with the article, the lowermost sprocket 92 is pushed inwardly against the force of its spring so as not to interfere with the adhesive contact. The forward movement of the article M does not cease and, accordingly, the pull of tape 32 causes taping head 80 to rotate in a counterclockwise direction as viewed in FIG. 5. The tape 32 peels away from the taping head 80 onto the surface of the article M. As the head 80 rotates, the lowermost passage 88, which is applying a vacuum to the tape, passes the end of the vacuum manifold 72 and makes communication with the vent manifold 74. This releases the vacuum holding the tape onto the surface of the taping head. Before the succeeding sprocket 92 reaches the lowermost position, the solenoid returns the shaft 68 to its original position, thereby raising the head 80 to the position illustrated in FIG. 6. One of the teeth 98 on the taping head then engages the cog 104 on the stationary shaft 100, abruptly halting rotation of the head 80 and causing the tape 32 to separate along the line of perforations 37 next adjacent the lowermost sprocket. Of course, as tape 32 is peeled from the taping head 80 the take-up shaft 44 moves forwardly against the tension of springs 50. And, the motor 26 is actuated as previously described to replenish the working supply of tape 30 to the applying means 58.

The article M with the tape 32 partially adhering thereto and partially extending from the edge as a tab, continues along its path to guide plate 108. Guide plate 108 is curved in such a manner that it is engaged by the tab 32 extending from the edge of the article M. The tab 32 is guided downwardly and under the edge of the article M until it engages the bottom of the article and thereby encircles the edge. The article M thereafter passes through the pinching rollers 110a, 110b which insures the adhesion of the tape to the edge. The resultant seals are illustrated in FIG. 2 as seal SL on the left side of the article and seal SR on the right side of the article.

Trailing Edge Sealing Station

Station B of FIG. 1 is a station for sealing the trailing edge of the article M when such additional sealing is desired. The basic components of this station are substantially identical to those of station A - namely, for example, the tape roll 28, the backing spool 60, and the applicator 58. However, since only one seal is applied at this station, these elements are not duplicated. They are given similar reference numerals as those of station A, but with the subscript "b". The taping head 80b is substantially aligned with the longitudinal mid-line of article M. The operation of these elements is substantially identical to those previously described except for the timing. The timing is ordered in such a fashion that the first half of a tape section is applied to the article M, thereby leaving a trailing tab "t". As illustrated in FIG. 14, the bed plate 10 is provided with an aperture 128 just downstream from the tape applying means 58b. Mounted above this aperture is an air nozzle 130 which directs a blast or stream of air downwardly and against the tab t thereby deflecting it downwardly. Of course, if it is undesirable to provide for a continuous stream of air, the air blast may be controlled by a signal derived from the logic circuit 122 associated with station B and fed to the source of supply of air which feeds nozzle 130. Positioned below the bed plate on a pair of sprockets 132, 134 is a chain 136 which carries a horizontal roller 138. The chain and roller move around the sprockets 132, 134 in a clockwise direction at a speed of approximately twice that of the article M. A metal guide shoe 140, having a curved receiving edge 142, serves as a back-up and the roller 138 forces tab t upwardly against the article M forming a trailing edge seal ST as shown in FIG. 2.

Forward Edge Sealing Station

Sealing station C provides a seal on the forward edge of the article M where such additional seal is desired. The basic elements of station C are quite similar to those of station B and accordingly are given the same reference numerals but with the subscript "c". However, there is one important distinction as will be noted by reference to FIGS. 16 and 17. This is that the sprockets 92 are not aligned radially with the ribs 98 but are positioned halfway between these ribs. The reason for this distinction will become apparent from a consideration of FIG. 17 which illustrates the sequence of operations. In FIG. 17a, the taping head 80c is illustrated in its "at rest" position with one of the teeth 98 positioned against the cog 104 on the stationary shaft. In this condition, the end of tape 32 is free and extends beyond the bottom tangent of the transport ring, as shown in FIG. 17a. When the leading edge of the mailing piece M is directly below the taping head 80, the tape applying means 58 is moved downwardly so as to contact the leading edge of the article M with the tape 32 as shown in FIG. 17b. Continued movement of the article M then rotates the taping head 80 in a counter-clockwise direction and, after a short rotation, it is returned to its upper position wherein the succeeding rib 98 engages stationary rib 104, as shown in FIG. 17c. This abruptly halts rotation and causes the tape to break at the perforations 37 thereby leaving a forwardly extending tab for the next succeeding article.

As shown in FIG. 17c, the article M proceeds downstream with the tape forming a freely extending tab t' as shown. Referring back to FIG. 16, the bed plate 10 defines an aperture 144 downstream from the tape applying means 58c and above this aperture is positioned an air nozzle 146. Nozzle 146, which may be controlled in a manner similar to nozzle 130, directs a blast of air downwardly, thereby deflecting tab t' which is thereafter forced backward and pinched between a pair of pinch rollers 148a, b. In this manner, a forward seal SF is applied to the article M as shown in FIG. 2.

It is believed that the many advantages of this invention will now be apparent to those skilled in the art. It will also be apparent that a number of variations and modifications may be made in this invention without departing from its spirit and scope. Accordingly, the foregoing description is to be construed as illustrative only, rather than limiting. This invention is limited only by the scope of the following claims.

What is claimed is:

1. Apparatus for sealing an article of folded sheet material having opposite side surfaces and a pair of substantially aligned edges to be sealed, which comprises: means for moving said article along a predetermined path of travel; tape applying means including a rotatable taping head; said taping head having a substantially cylindrical surface which is normally spaced from said article; a supply of sealing tape having a non-adhesive major surface and an adhesive major surface; means for partially wrapping said sealing tape on said taping head to dispose the non-adhesive surface in contact with the taping head surface and expose the adhesive surface; means for moving the taping head and thus the tape wrapped thereon toward and away from said article to adhere a portion of a length of wrapped tape to one side of said article; means for holding non-adhered wrapped tape against said taping head, whereby the movement of the article to which said tape length is adhered commences rotating said taping head; means for detaching said length of tape from said head including means for abruptly halting rotation of the taping head, whereby said moving article breaks said adhered length of tape away from non-adhered wrapped tape; and means for folding said length of tape around said aligned edges and into adherence with the opposite side surface of said article thereby sealing said aligned edges.

2. The apparatus of claim 1 wherein said holding means includes means for sustaining a vacuum between a portion of the surface of said taping head and the tape wrapped thereon.

3. The apparatus according to claim 1 including a source of supply of vacuum, said taping head including a plurality of evacuatable channels formed in said head, and said tape holding means including means for connecting said channels to said source.

4. The apparatus according to claim 3 wherein said taping head includes a substantially planar surface having formed thereon a plurality of arcuately-spaced apertures, each of said apertures communicating with a different one of said channels, said tape applying means including a non-rotatable block having an arcuately-extending vacuum chamber formed therein, and said chamber communicating with said vacuum source 5. The apparatus of claim 1 wherein said tape applying means includes a movable bracket normally supporting said taping head with its cylindrical surface spaced from said article; and means for moving said bracket to engage the adhesive surface of said length of tape and said article.

6. The apparatus of claim 5 wherein said tape applying means includes a non-rotatable manifold block; and said taping head is annular, rotatable, and coaxial with said block for carrying said wrapped tape thereon.

7. The apparatus of claim 1 wherein said tape is transversely perforated at regularly spaced intervals longitudinally of its length; and said means for abruptly halting the rotation of said taping head including stationary means engageable by said taping head for blocking rotation thereof, said taping head being movable into engagement with said stationary means to thereby break said tape at one of the perforations thereof.

8. The apparatus of claim 7 wherein said rotation halting means comprises: a plurality of axially extending teeth formed integral with said taping head, said teeth arcuately-spaced around an internal surface of the taping head; and a fixed member extending through said annular taping head including stop means positioned to engage one of said teeth when said applicator head is disposed out of engagement with said article.

* * * * *